(12) United States Patent
Zhang et al.

(10) Patent No.: US 12,521,361 B2
(45) Date of Patent: Jan. 13, 2026

(54) USE OF SODIUM OCTANOATE IN PREPARATION OF MEDICINE FOR IMPROVING THE EFFICACY OF CARDIOPULMONARY RESUSCITATION AND POST-RESUSCITATION MULTIPLE ORGAN DYSFUNCTION

(71) Applicant: ZHEJIANG UNIVERSITY, Zhejiang (CN)

(72) Inventors: Mao Zhang, Zhejiang (CN); Jiefeng Xu, Zhejiang (CN)

(73) Assignee: Zhejiang University, Zhejiang (CN)

( * ) Notice: Subject to any disclaimer, the term of this patent is extended or adjusted under 35 U.S.C. 154(b) by 402 days.

(21) Appl. No.: 18/176,008

(22) Filed: Feb. 28, 2023

(65) Prior Publication Data

US 2023/0201154 A1    Jun. 29, 2023

Related U.S. Application Data

(63) Continuation-in-part of application No. PCT/CN2022/097056, filed on Jun. 6, 2022.

(30) Foreign Application Priority Data

Oct. 22, 2021    (CN) .......................... 202111232650.5

(51) Int. Cl.
    *A61K 31/20*    (2006.01)
    *A61P 9/04*    (2006.01)

(52) U.S. Cl.
    CPC ............... *A61K 31/20* (2013.01); *A61P 9/04* (2018.01)

(58) Field of Classification Search
    CPC ............... A61K 31/20; A61P 9/00; A61P 9/04
    See application file for complete search history.

(56) References Cited

FOREIGN PATENT DOCUMENTS

CN    113730388 A    12/2021

OTHER PUBLICATIONS

Lei et al. Acetyl-CoA production by select metabolic pathways promotes cardiac repair after myocardial infarction via mediating histone acetylation, bioRxiv preprint doi: https://doi.org/10.1101/622746; version posted Dec. 24, 2019.*
Alrob et al. Biochem. Soc. Trans. 2014, 42, 1043-1051.*
Madathil et al. Resuscitation 2016, 105, 85-91.*
Alves, Marco G, et al., "Substrate selection in hearts subjected to ischemia/reperfusion: role of cardioplegic solutions and gender", NMR Biomed. 24:1029-1037 (Jan. 28, 2011).
Harmancey, Romain , et al., "Decreased long-chain fatty acid oxidation impairs postischemic recovery of the insulin-resistant rat heart", FASEB J 27:3966-3978 (Oct. 31, 2013).
Lei, Lenglam , et al., "Acetyl-CoA production by specific metabolites promotes cardiac repair after myocardial infarction via histone acetylation", eLife 0:e60311 (Dec. 23, 2021) 16 pages.
Montessuit, Christophe , et al., "Postischemic recovery of heart metabolism and function: role of mitochondrial fatty acid transfer", J Appl Physiol 89:111-119 (Jul. 31, 2000).
International Search Report and Written Opinion corresponding to PCT/CN2022/097056; mailed Sep. 8, 2022 (22 pages, including English translation).
First Office Action corresponding to CN 202111232650.5; issued Feb. 29, 2024 (8 pages, including English translation).

* cited by examiner

*Primary Examiner* — Irina Neagu
(74) *Attorney, Agent, or Firm* — Myers Bigel, P.A.

(57) ABSTRACT

The present disclosure provides the use of sodium octanoate in preparation of a medicine for improving the efficacy of cardiopulmonary resuscitation and post-resuscitation multiple organ dysfunction, and relates to the technical field of pharmaceutical preparation. The above medicine for improving the efficacy of cardiopulmonary resuscitation and post-resuscitation multiple organ dysfunction comprises the administration of a pharmaceutically effective dose of sodium octanoate. By administering a pharmaceutically effective dose of sodium octanoate that is used for promoting fatty acid oxidation energy supply during systemic ischemia-reperfusion injury caused by cardiac arrest and resuscitation, this medicine can further effectively improve the efficacy of cardiopulmonary resuscitation and post-resuscitation multiple organ dysfunction.

5 Claims, 5 Drawing Sheets

USE OF SODIUM OCTANOATE IN PREPARATION OF MEDICINE FOR IMPROVING THE EFFICACY OF CARDIOPULMONARY RESUSCITATION AND POST-RESUSCITATION MULTIPLE ORGAN DYSFUNCTION

CROSS REFERENCE TO RELATED APPLICATIONS

This application is a continuation-in-part of and claims priority to PCT Application No. PCT/CN2022/097056, filed on Jun. 6, 2022, which claims the benefit of priority to the Chinese patent application filed on Oct. 22, 2021 with the Chinese Patent Office with the filing No. CN202111232650.5 and entitled "Use of Sodium Octanoate in Preparation of Medicine for Improving the Efficacy of Cardiopulmonary Resuscitation and Post-Resuscitation Multiple Organ Dysfunction", the contents of each of which are incorporated herein by reference in entirety.

FIELD OF THE INVENTION

The present disclosure relates to the technical field of pharmaceutical preparation, in particular to use of sodium octanoate in preparation of a medicine for improving the efficacy of cardiopulmonary resuscitation and post-resuscitation multiple organ dysfunction.

BACKGROUND OF THE INVENTION

Cardiac arrest events are a major public health problem with high incidence and low survival rate worldwide. Data show that about 350,000 people in Europe and United States experience cardiac arrest events every year, up to 550,000 in China, while the survival rate of discharged patients is only about 10%, and a large number of survivors have serious neurological dysfunction. Cardiac arrest has become a significant cause of death and poor survival prognosis for human beings.

Researches show that after cardiac arrest event occurs, the body's energy supply plummets to halt, further various types of pathological damage such as oxidative stress, inflammatory response, and mitochondrial dysfunction are initiated, causing the cells to be killed in various forms such as apoptosis, necrosis, and pyroptosis, and finally, multiple organ dysfunction and even death of the body are caused. Therefore, in the cardiopulmonary resuscitation treatment process after occurrence of cardiac arrest event, timely supplement of effective energy substances in an early stage may limit the occurrence and development of the above types of pathological damage, and further reduce the severity of important organs and improve the survival outcome of the patients.

Currently, the most commonly used and readily available energy supplement substance in the clinical setting is glucose. However, after experiencing cardiac arrest event, the body often develops insulin resistance and impaired glucose utilization, and further presents a state of stress hyperglycemia.

Therefore, it becomes quite necessary and urgent to search for an effective energy supplement substance that can replace glucose in a stress state of the body, and further effectively improve the efficacy of cardiopulmonary resuscitation and post-resuscitation multiple organ dysfunction.

SUMMARY OF THE INVENTION

The present disclosure provides use of sodium octanoate in preparation of a medicine for improving the efficacy of cardiopulmonary resuscitation.

In some embodiments, the use is administration of a pharmaceutically effective dose of sodium octanoate.

In some embodiments, the pharmaceutically effective dose of sodium octanoate is 14.2~28.5 mg/kg. In some embodiments, the pharmaceutically effective dose of sodium octanoate is 28.5 mg/kg.

In some embodiments, improving the efficacy of cardiopulmonary resuscitation by sodium octanoate is to effectively supply energy to the body in a stress state of the body.

In some embodiments, the medicine is an injection.

The present disclosure further provides the use of sodium octanoate in preparation of a medicine for improving multiple organ dysfunction after cardiopulmonary resuscitation.

In some embodiments, the use is administration of a pharmaceutically effective dose of sodium octanoate.

In some embodiments, the pharmaceutically effective dose of sodium octanoate is 14.2~28.5 mg/kg. In some embodiments, the pharmaceutically effective dose of sodium octanoate is 28.5 mg/kg.

In some embodiments, sodium octanoate is used to promote fatty acid oxidation energy supply during systemic ischemia-reperfusion injury caused by cardiac arrest and resuscitation.

In some embodiments, multiple organ dysfunction includes cardiac dysfunction, cerebral dysfunction, and renal and intestinal injuries.

In some embodiments, the medicine is an injection.

The present disclosure further provides the use of sodium octanoate for improving the efficacy of cardiopulmonary resuscitation.

In some embodiments, improving the efficacy of cardiopulmonary resuscitation by sodium octanoate is to effectively supply energy to the body in a stress state of the body.

The present disclosure further provides the use of sodium octanoate for improving multiple organ dysfunction after cardiopulmonary resuscitation.

In some embodiments, sodium octanoate is used to promote fatty acid oxidation energy supply during systemic ischemia-reperfusion injury caused by cardiac arrest and resuscitation.

In some embodiments, multiple organ dysfunction includes cardiac dysfunction, cerebral dysfunction, and renal and intestinal injuries.

In some embodiments, the use according to any one of the above is administration of a pharmaceutically effective dose of sodium octanoate.

In some embodiments, the pharmaceutically effective dose of sodium octanoate in the above is 14.2 mg/kg~28.5 mg/kg. In some embodiments, the pharmaceutically effective dose of sodium octanoate in the above is 28.5 mg/kg.

The present disclosure further provides a method for treating multiple organ dysfunction after cardiopulmonary resuscitation, wherein the method includes: administering to a subject in need thereof a therapeutically effective amount of sodium octanoate.

In some embodiments, the method includes: administering to a subject in need thereof a therapeutically effective amount of sodium octanoate and a pharmaceutically acceptable carrier.

BRIEF DESCRIPTION OF DRAWINGS

In order to more clearly illustrate embodiments of the present disclosure or technical solutions in the prior art, accompanying drawings which need to be used in the description of the embodiments or the prior art will be introduced briefly below. Apparently, the accompanying drawings in the description below are for some embodiments of the present disclosure. Those ordinarily skilled in the art still could obtain other accompanying drawings in light of these accompanying drawings, without using creative efforts.

DETAILED DESCRIPTION OF EMBODIMENTS

Technical solutions of the present disclosure will be described below clearly and completely in connection with examples. Apparently, the described examples are only some but not all examples of the present disclosure. All of other examples, obtained by those ordinarily skilled in the art based on the examples of the present disclosure without using creative efforts, shall fall into the scope of protection of the present disclosure.

Some embodiments of the present disclosure provide use of sodium octanoate in preparation of a medicine for improving the efficacy of cardiopulmonary resuscitation. Some embodiments of the present disclosure further provide use of sodium octanoate for improving the efficacy of cardiopulmonary resuscitation.

The use of sodium octanoate in preparation of a medicine for improving the efficacy of cardiopulmonary resuscitation provided in the present disclosure includes the administration of a pharmaceutically effective dose of sodium octanoate, wherein the method for improving the efficacy of cardiopulmonary resuscitation by sodium octanoate is to effectively supply energy to the body in a stress state of the body.

The use of sodium octanoate for improving the efficacy of cardiopulmonary resuscitation provided in the present disclosure includes the administration of a pharmaceutically effective dose of sodium octanoate, wherein the method for improving the efficacy of cardiopulmonary resuscitation by sodium octanoate is to effectively supply energy to the body in a stress state of the body.

It should be noted that fatty acid is an effective energy supply substance for replacing glucose in the stress state of the body, and good research evidence has been obtained for sodium octanoate, a representative substance of fatty acid. Initially, it is found from researches that sodium octanoate is an important energy substrate for fatty acid oxidation energy supply pathway and can be used as an energy source for important organs such as heart, liver, and skeletal muscle. Sodium octanoate can improve myocardial function after regional cardiac ischemia-reperfusion injury by enhancing fatty acid oxidation energy supply pathway, of which the protective mechanism is related to the inhibition of mitochondrial oxidative stress. However, it is not clear whether sodium octanoate can improve the efficacy of cardiopulmonary resuscitation and post-resuscitation multiple organ dysfunction by promoting fatty acid oxidation energy supply during systemic ischemia-reperfusion injury caused by cardiac arrest and resuscitation. Therefore, by studying the use effect of sodium octanoate during cardiopulmonary resuscitation after cardiac arrest and the protection of multiple organ injury after resuscitation, and performing product research and development and clinical transformation of the medicine on this basis, a new important medical means will be provided for clinical cardiopulmonary resuscitation, with very good research significance and application prospect.

In some embodiments, improving the efficacy of cardiopulmonary resuscitation is to increase survival rate of individuals.

In an optional embodiment of the present disclosure, the pharmaceutically effective dose of sodium octanoate is 14.2 mg/kg~28.5 mg/kg, for example, 15 mg/kg~28 mg/kg, 17 mg/kg~26 mg/kg or 19 mg/kg~24 mg/kg. In some embodiments, the pharmaceutically effective dose of sodium octanoate is, for example, 14.2 mg/kg, 16 mg/kg, 18 mg/kg, 20 mg/kg, 22 mg/kg, 24 mg/kg, 26 mg/kg, 28 mg/kg, and 28.5 mg/kg.

In an optional embodiment of the present disclosure, improving the efficacy of cardiopulmonary resuscitation by sodium octanoate is to effectively supply energy to the body in a stress state of the body.

In an optional embodiment of the present disclosure, the medicine is an injection.

Some embodiments of the present disclosure provide the use of sodium octanoate in preparation of a medicine for improving multiple organ dysfunction after cardiopulmonary resuscitation. Some embodiments of the present disclosure further provide the use of sodium octanoate for improving multiple organ dysfunction after cardiopulmonary resuscitation.

The use of sodium octanoate in preparation of a medicine for improving multiple organ dysfunction after cardiopulmonary resuscitation provided in the present disclosure includes the administration of a pharmaceutically effective dose of sodium octanoate, wherein sodium octanoate is used to promote fatty acid oxidation energy supply during systemic ischemia-reperfusion injury caused by cardiac arrest and resuscitation.

In the use for improving multiple organ dysfunction after cardiopulmonary resuscitation provided in the present disclosure, the use includes administering a therapeutically effective amount of sodium octanoate, wherein sodium octanoate is used to promote fatty acid oxidation energy supply during systemic ischemia-reperfusion injury caused by cardiac arrest and resuscitation.

In some embodiments, the medicine includes sodium octanoate and a pharmaceutically acceptable carrier.

In an optional embodiment of the present disclosure, the pharmaceutically effective dose of sodium octanoate is 14.2 mg/kg~28.5 mg/kg, for example, 15 mg/kg~28 mg/kg, 17 mg/kg~26 mg/kg or 19 mg/kg~24 mg/kg. In some embodiments, the pharmaceutically effective dose of sodium octanoate is, for example, 14.2 mg/kg, 16 mg/kg, 18 mg/kg, 20 mg/kg, 22 mg/kg, 24 mg/kg, 26 mg/kg, 28 mg/kg, and 28.5 mg/kg.

In an optional embodiment of the present disclosure, sodium octanoate is used to promote fatty acid oxidation energy supply during systemic ischemia-reperfusion injury caused by cardiac arrest and resuscitation.

In an optional embodiment of the present disclosure, multiple organ dysfunction includes cardiac dysfunction, cerebral dysfunction, and renal and intestinal injuries.

In an optional embodiment of the present disclosure, the medicine is an injection.

Some embodiments of the present disclosure provide a method for treating multiple organ dysfunction after cardiopulmonary resuscitation, including: administering to a subject in need thereof a therapeutically effective amount of sodium octanoate.

In some embodiments, the method includes: administering to a subject in need thereof a therapeutically effective amount of sodium octanoate and a pharmaceutically acceptable carrier.

Some embodiments of the present disclosure provide a method for improving the efficacy of cardiopulmonary resuscitation, wherein the method comprises: administering to a subject in need thereof a pharmaceutically effective dose of sodium octanoate.

In some embodiments, the method comprises: administering to the subject in need thereof the pharmaceutically effective dose of sodium octanoate and a pharmaceutically acceptable carrier.

In some embodiments, the pharmaceutically effective dose of sodium octanoate is 14.2 mg/kg~28.5 mg/kg.

In some embodiments, the pharmaceutically effective dose of sodium octanoate is 28.5 mg/kg.

In some embodiments, improving the efficacy of cardiopulmonary resuscitation by the sodium octanoate is to effectively supply energy to the body in a stress state of the body.

Some embodiments of the present disclosure provide a method for improving multiple organ dysfunction after cardiopulmonary resuscitation, wherein the method comprises: administering to a subject in need thereof a pharmaceutically effective dose of sodium octanoate.

In some embodiments, the method comprises: administering to the subject in need thereof the pharmaceutically effective dose of sodium octanoate and a pharmaceutically acceptable carrier.

In some embodiments, the pharmaceutically effective dose of sodium octanoate is 14.2 mg/kg~28.5 mg/kg.

In some embodiments, the pharmaceutically effective dose of sodium octanoate is 28.5 mg/kg.

In some embodiments, the sodium octanoate is used to promote fatty acid oxidation energy supply during systemic ischemia-reperfusion injury caused by cardiac arrest and resuscitation.

In some embodiments, multiple organ dysfunction comprises cardiac dysfunction, cerebral dysfunction, and renal and intestinal injuries.

In the use of sodium octanoate in preparation of a medicine for improving the efficacy of cardiopulmonary resuscitation and the use of sodium octanoate for improving the efficacy of cardiopulmonary resuscitation provided in the present disclosure, the use includes the administration of a pharmaceutically effective dose of sodium octanoate, wherein the method for improving the efficacy of cardiopulmonary resuscitation by sodium octanoate is to effectively supply energy to the body in a stress state of the body.

In the use of sodium octanoate in preparation of a medicine for improving multiple organ dysfunction after cardiopulmonary resuscitation and the use of sodium octanoate for improving multiple organ dysfunction after cardiopulmonary resuscitation provided in the present disclosure, the use includes administration of a pharmaceutically effective dose of sodium octanoate, wherein sodium octanoate is used to promote fatty acid oxidation energy supply during systemic ischemia-reperfusion injury caused by cardiac arrest and resuscitation.

EXAMPLES

The technical solutions of the present disclosure will be further explained below in connection with examples.

Example 1 Animal Preparation

1. All animals started fasting without water deprivation 12 h before experiment.
2. The experimental animals were firstly intramuscularly injected with midazolam by 0.4-0.5 mg/kg for induced anesthesia, connected to an electrocardiogram monitor, then injected with propofol by 2 mg/kg through ear vein for general anesthesia, and afterwards maintained in an anesthetic state through infusing 4 mg/kg/h via the vein.
3. Endotracheal intubation, monitoring of partial pressure of end-tidal carbon dioxide ($ETCO_2$), and mechanical ventilation were rapidly carried out, wherein ventilation parameters were an intermittent positive pressure ventilation (IPPV) mode, with oxygen concentration of 21%, tidal volume of 10 ml/kg, and positive end-expiratory pressure of 0 mmHg, and $ETCO_2$ was maintained in a normal physiological range of 35-40 mmHg by adjusting respiratory frequency.
4. Right femoral artery and vein were exposed by operation, and Swan-Ganz catheters were respectively disposed into thoracic aorta and right atrium, wherein the former was used to monitor aortic blood pressure and collect an arterial blood sample, and the catheter main chamber of the latter was used to monitor right atrial pressure and body temperature and collect a venous blood sample, a catheter side chamber was used to infuse a therapeutic medicine, and calculate the level of coronary perfusion pressure (CPP) according to the difference between decompression diastolic aortic and time-coincident right atrial pressures.
5. Right external jugular vein was exposed by operation, and an inducing electrode for ventricular fibrillation was disposed into right ventricle to induce ventricular fibrillation later.
6. Right internal jugular vein and left femoral artery were exposed by operation, a central venous catheter and a thermodilution arterial catheter were respectively disposed therein, and the two were connected to a pulse indication continuous cardiac output (PiCCO) monitor, for monitoring the changes of cardiac function including stroke volume (SV) and global ejection fraction (GEF).
7. Right carotid artery was exposed by operation, superficial fascia was stripped off, a carotid blood flow sensor was arranged, and then a blood flow velocity ultrasonic recorder was connected to monitor the change of carotid blood flow (CBF) in real time.
8. The animals' forehead hair was shaved off, to expose forehead skin. The forehead skin was cleaned with alcohol, and attached with a cerebral oxygen monitoring probe, and then a cerebral oxygen monitor was attached to monitor the change of regional cerebral oxygen saturation ($rSO_2$) in real time.

9. The body temperature of the animals was maintained at a normal temperature of about 38° C. all the time by using a temperature control blanket.

Example 2 Establishment of Model

1. Setting model conditions: 8 min of cardiac arrest and 8 min of cardiopulmonary resuscitation.
2. Cardiac arrest method: inducing ventricular fibrillation by right ventricular electrode discharge, and observing for 8 min without intervention.
3. Cardiopulmonary resuscitation method:
   1) continuous manual external chest compression;
   2) mechanical ventilation was carried out by using a respirator (parameters were IPPV (intermittent positive pressure ventilation) mode, with oxygen concentration of 100%, tidal volume of 7 ml/kg, respiratory frequency of 10 times/min, and positive end-expiratory pressure of 0 mmHg);
   3) adrenalin: when cardiopulmonary resuscitation was performed for 2 min, adrenalin was given by 20 μg/kg, thereafter, the same was repeated every 4 min;
   4) defibrillation: when cardiopulmonary resuscitation was performed for 8 min, 150 J electrical defibrillation was performed once; and
   5) if spontaneous circulation was not restored, cardiopulmonary resuscitation was immediately restarted for 2 min, followed by one time of defibrillation. This cycle was repeated for 5 times or less until the resuscitation was successful or declared to be failed.
4. Monitoring for 4 h after resuscitation:
   1) restarting mechanical ventilation (parameters were IPPV mode, with oxygen concentration of 21%, tidal volume of 10 ml/kg, positive end-expiratory pressure of 3 mmHg, and the respiratory frequency was restored to a pre-modeling state);
   2) continuing anesthesia and monitoring; and
   3) maintaining a normal body temperature of 38° C.
5. Observing pigsty for 20 h.

Example 3 Animal Test (I). Experiment Grouping:
   24 domestic healthy male white pigs, with a body weight of about 35 kg, were randomly divided into 3 groups: Sham group (n=6), CPR group (n=10), CPR+SO group (n=8), wherein Sham indicates sham operation; CPR indicates cardiopulmonary resuscitation; and SO indicates sodium octanoate.
(II). Intervention Measures:
   1) Sham group: the model of cardiac arrest and resuscitation wasn't established, and an equal amount of vehicle was intravenously administered as the other groups;
   2) CPR group: the model of cardiac arrest and resuscitation was established, and was administered with an equal amount of vehicle as the other groups while CPR was started; and
   3) CPR+SO group: the model of cardiac arrest resuscitation was established, and sodium octanoate dissolved in an equal amount of vehicle was intravenously administered by 28.5 mg/kg while CPR was started.
   Notes: Sham, sham operation; CPR, cardiopulmonary resuscitation; and SO, sodium octanoate.
(III). Observation Indexes:
1. Changes in physiological indexes such as heart rate, blood pressure, ETCO$_2$, CBF, rSO$_2$, and body temperature were dynamically monitored throughout the experiment, and the survival outcomes of the animals at 4 h and 24 h were recorded.
2. During cardiopulmonary resuscitation, the changes in CPP, ETCO$_2$, CBF, and rSO$_2$ were continuously monitored dynamically, and the duration of cardiopulmonary resuscitation, number of defibrillation, dosage of adrenaline, and rate of return of spontaneous circulation of various groups of animals were recorded.
3. Before modeling and at 1 h, 2 h, and 4 h after resuscitation, the changes in cardiac function such as SV and GEF were periodically detected by using a PiCCO monitor.
4. Before modeling and at 1 h, 2 h, 4 h, and 24 h after resuscitation, venous blood samples were collected, and centrifuged to obtain blood plasma. The blood plasma was frozen and stored in a −80° C. deep hypothermia freezer, and serum levels of myocardial injury biomarker cardiac troponin I (cTnI), brain injury biomarker neuron specific enolase (NSE) and S100B protein (S100B), renal and intestinal injury biomarker creatinine (Cr) and intestinal fatty acid-binding protein (iFABP) were detected by using an enzyme-linked immunosorbent assay at selected time.
5. At 24 h after resuscitation, neurological deficit score (NDS) is used to evaluate neurological function, then the animals were euthanized, and tissues of left ventricular apex, cerebral frontal cortex, hippocampus, upper pole of right kidney, and end of ileum were rapidly acquired, and fixed, embedded, sectioned, etc., and then cell apoptosis in the heart, brain, kidney, and intestine was detected by TUNEL.

(IV) Test Results:
1. Baseline Characteristics of Various Groups of Animals:
   Differences in baseline data of the three groups of animals, including body weight, heart rate, mean arterial pressure, ETCO$_2$, CBF, rSO$_2$, and body temperature had no statistical significance (all P>0.05). See Table 1.

TABLE 1

Baseline characteristics of various groups of animals ($\bar{x} \pm s$):

| Group | Sham | CPR | CPR + SO |
|---|---|---|---|
| Body weight (kg) | 39.3 ± 2.3 | 38.3 ± 2.7 | 39.8 ± 1.9 |
| Heart rate (bpm) | 93.0 ± 9.4 | 98.1 ± 8.9 | 95.3 ± 9.6 |
| Mean arterial pressure (mmHg) | 108.2 ± 6.5 | 112.3 ± 8.2 | 106.8 ± 9.0 |
| ETCO$_2$ (mmHg) | 41.5 ± 1.0 | 40.8 ± 1.9 | 41.4 ± 1.8 |
| CBF (ml/min) | 202.8 ± 16.7 | 202.6 ± 14.9 | 206.3 ± 18.5 |
| rSO$_2$ (%) | 59.7 ± 1.8 | 59.7 ± 1.9 | 57.8 ± 3.2 |
| Body temperature (° C.) | 37.5 ± 0.3 | 37.7 ± 0.4 | 37.7 ± 0.4 |

Notes:
ETCO$_2$, partial pressure of end-tidal carbon dioxide; CBF, carotid blood flow; rSO$_2$, regional cerebral oxygen saturation; Sham, Sham operation; CPR, cardiopulmonary resuscitation; SO, sodium octanoate.

Figure 1:
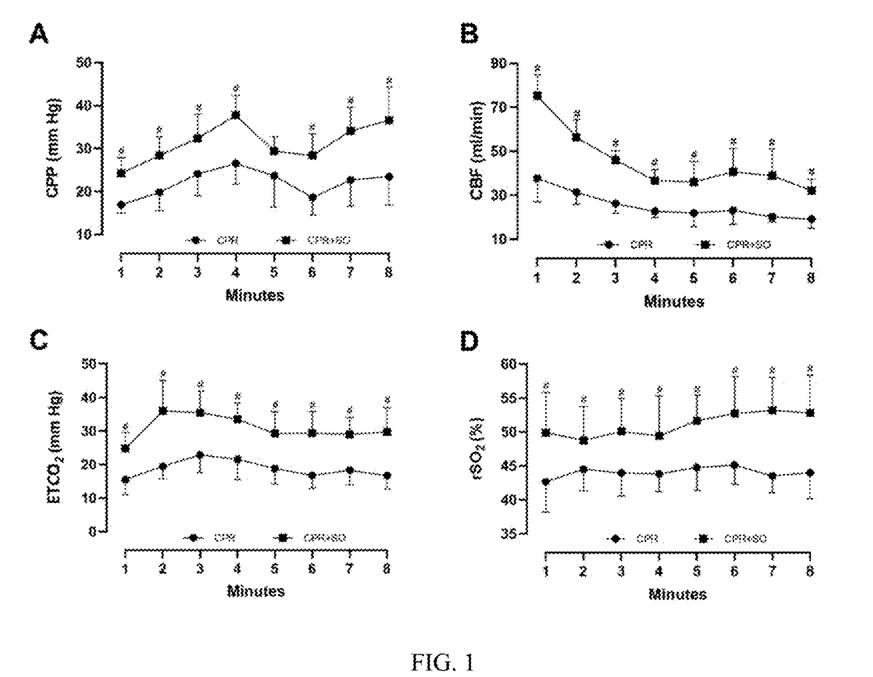
FIG. 1 shows diagrams of effect of sodium octanoate on cardiac and cerebral perfusion during cardiopulmonary resuscitation provided in Example 3 of the present disclosure.

2. The Outcomes of Cardiopulmonary Resuscitation of Various Groups of Animals:
   The CPR group and the CPR+SO group underwent a process including cardiac arrest and resuscitation. However, during the cardiopulmonary resuscitation, heart and cerebral perfusion indexes such as CPP, ETCO$_2$, CBF, and rSO$_2$ of the CPR+SO group were obviously higher than those of the CPR group at almost all time points, and differences between the groups all had statistical significance (all P<0.05). See FIG. 1.
   FIG. 1 shows diagrams of effect of sodium octanoate on cardiac and cerebral perfusion during cardiopulmonary resuscitation. A in FIG. 1 is a diagram of the changes of coronary perfusion pressure; B in FIG. 1 is a diagram of the changes of carotid blood flow; C in FIG. 1 is a diagram of the changes of partial pressure of end-tidal carbon dioxide; and D in FIG. 1 is a diagram of the changes of regional cerebral oxygen saturation.

In FIG. 1, CPP is coronary perfusion pressure; CBF is carotid blood flow; $ETCO_2$ is partial pressure of end-tidal carbon dioxide; $rSO_2$ is regional cerebral oxygen saturation; CPR is cardiopulmonary resuscitation; SO is sodium octanoate. Compared with the CPR group, #$P<0.05$.

Compared with the CPR group, for the CPR+SO group, duration of cardiopulmonary resuscitation was shortened, number of defibrillation was reduced, and dosage of adrenaline was decreased, meanwhile, the rate of return of spontaneous circulation and the survival rates at 4 h and 24 h post-resuscitation were increased, and the differences between the groups all had statistical significance (all $P<0.05$). See Table 2.

TABLE 2

The outcomes of cardiopulmonary resuscitation of various groups of animals:

| Group | CPR | CPR + SO |
| --- | --- | --- |
| Duration of cardiopulmonary resuscitation (min) | 13.20 ± 5.09 | 8.00 ± 0.00# |
| Dosage of adrenaline (mg) | 2.84 ± 1.27 | 1.59 ± 0.08# |
| Number of defibrillation (n) | 3.60 ± 2.55 | 1.00 ± 0.00# |
| Return of spontaneous circulation (n/n) | 5/10 | 8/8# |
| 4-h survival (n/n) | 5/10 | 8/8# |
| 24-h survival (n/n) | 5/10 | 8/8# |

Notes:
CPR, cardiopulmonary resuscitation; SO, sodium octanoate. Compared with the CPR group,
$P < 0.05$.

Example 4 Analysis of Injury Biomarkers of Various Groups of Animals

In the present example, the injury biomarkers of the animals are analyzed for the Sham group, the CPR group, and the CPR+SO group.

1. Changes in Cardiac Function and Injury Biomarkers of Various Groups of Animals:

Before modeling, differences of cardiac function indexes SV and GEF values and myocardial injury biomarkers cTnI concentration in serum between the three groups have no statistical significance (all $P>0.05$). After resuscitation, it can be seen that the values of SV and GEF in both the CPR group and the CPR+SO group are obviously lower than those in the Sham group, while the serum levels of cTnI are markedly higher than that in the Sham group, and the differences between the groups have statistical significance (all $P<0.05$). However, compared with the CPR group, both the values of SV and GEF in the CPR+SO group starting 1 h after resuscitation are obviously higher than those in the CPR group, the serum level of cTnI starting 4 h after resuscitation is markedly lower than that in the CPR group, and the differences between groups all have statistical significance (all $P<0.05$). See FIG. 2.

Figure 2:
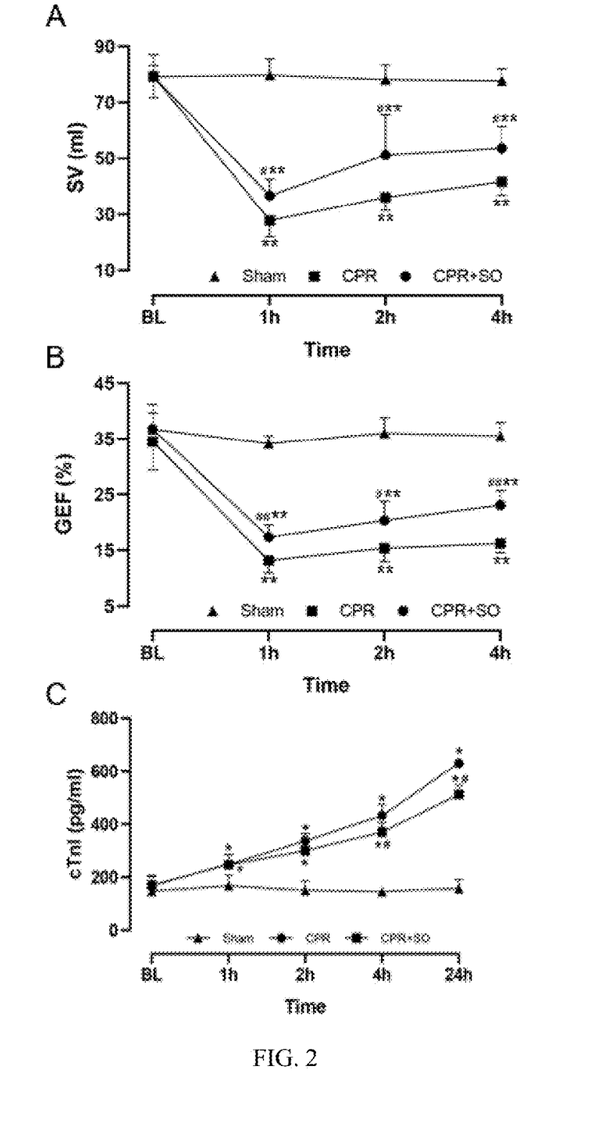
FIG. 2 shows diagrams of changes in cardiac function and injury biomarkers of various groups of animals provided in Example 4 of the present disclosure.

FIG. 2 shows diagrams of changes in cardiac function and injury biomarkers of various groups of animals. A in FIG. 2 is a diagram of changes in stroke volume; B in FIG. 2 is a diagram of changes in global ejection fraction; and C in FIG. 2 is a diagram of changes in cardiac troponin I.

In FIG. 2, SV is stroke volume; GEF is global ejection fraction; cTnI is cardiac troponin I; BL is the baseline value; Sham is sham operation; CPR is cardiopulmonary resuscitation; SO is sodium octanoate; compared with the Sham group, *$P<0.05$, **$P<0.01$; and compared with the CPR group, #$P<0.05$, ##$P<0.01$.

2. Changes in Cerebral Function and Injury Biomarkers of Various Groups of Animals:

Before modeling, the differences of serum levels of brain injury biomarkers NSE and S100B between the three groups have no statistical significance (all $P>0.05$). After resuscitation, it can be seen that the serum levels of NSE and S100B starting 1 h after resuscitation in the CPR group are obviously higher than those in the Sham group, the serum level of NSE starting 4 h after resuscitation and the serum level of S100B starting 2 h after resuscitation in the CPR+SO group are both remarkably higher than those in the Sham group, and the differences between the groups all have statistical significance (all $P<0.05$). However, compared with the CPR group, the serum level of NSE at 4 h and 24 h after resuscitation and the serum level of S100B at 1 h, 2 h, and 24 h after resuscitation in the CPR+SO group are all remarkably reduced, and the differences between the groups all have statistical significance (all $P<0.05$). Besides, the NDS scores in the CPR and CPR+SO groups at 24 h after resuscitation are obviously higher than that in the Sham group, and meanwhile, the NDS score in the CPR+SO group is remarkably lower than that in the CPR group, and the differences between the groups all have statistical significance (all $P<0.05$). See FIG. 3.

Figure 3:
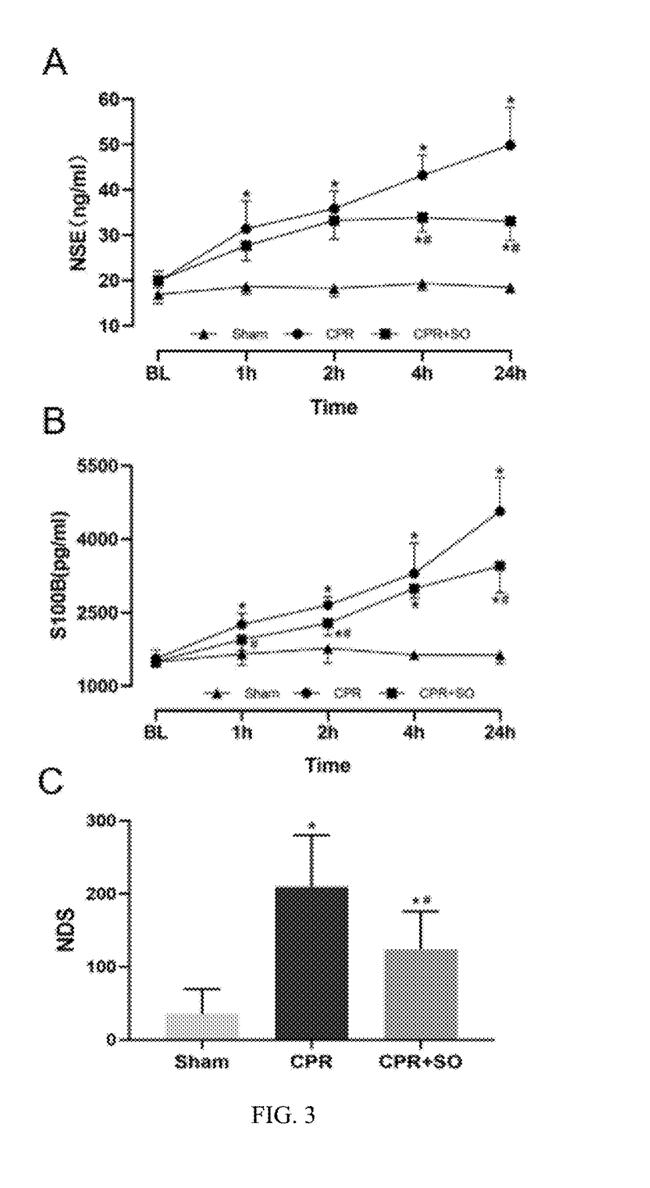
FIG. 3 shows diagrams of changes in brain function and injury biomarkers of various groups of animals provided in Example 4 of the present disclosure.

FIG. 3 shows diagrams of changes in cerebral function and injury biomarkers of various groups of animals. In the above, A in FIG. 3 is a diagram of changes in neuron specific enolase; B in FIG. 3 is a diagram of changes in S100B protein; and C in FIG. 3 is a diagram of neurological deficit score.

In FIG. 3, NSE is neuron specific enolase; S100B is S100B protein; NDS is neurological deficit score; BL is baseline value; Sham is sham operation; CPR is cardiopulmonary resuscitation; SO is sodium octanoate; compared with the Sham group, *$P<0.05$; and compared with the CPR group, #$P<0.05$.

3. Changes in Renal and Intestinal Injury Biomarkers of Various Groups of Animals:

Before modeling, the differences in the serum levels of renal and intestinal injury biomarkers Cr and iFABP among the three groups have no statistical significance (all $P>0.05$). After resuscitation, it can be seen that the serum levels of Cr and iFABP in the CPR and CPR+SO groups are both obviously higher than those in the Sham group, and the differences between the groups both have statistical significance (all $P<0.05$). However, compared with the CPR group, the serum levels of Cr at 2 h and 24 h after resuscitation and the serum level of iFABP at 24 h after resuscitation in the CPR+SO group are all remarkably reduced, and the differences between the groups all have statistical significance (all $P<0.05$). See FIG. 4.

Figure 4:
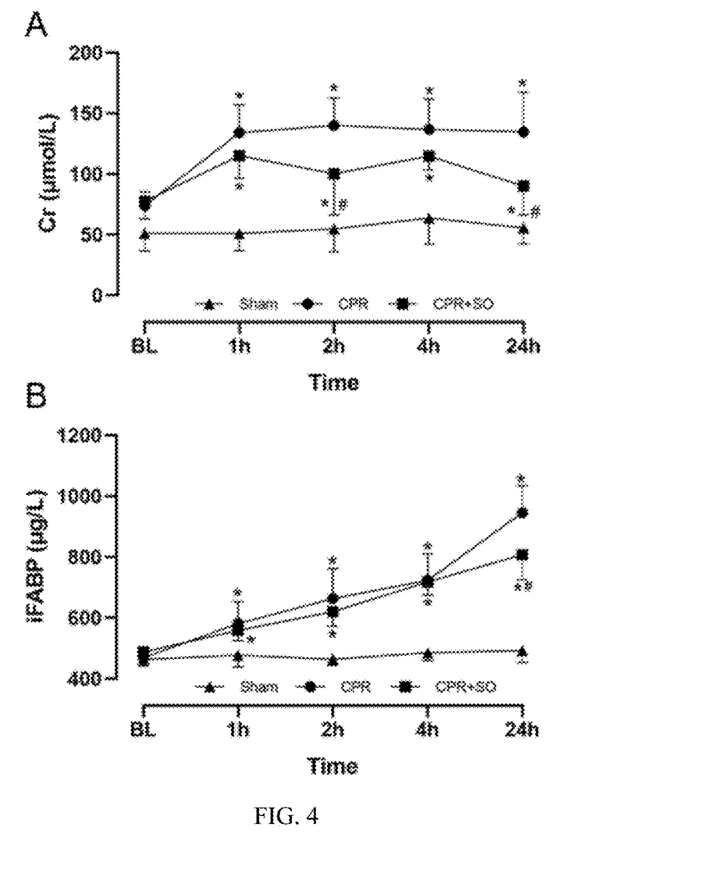
FIG. 4 shows diagrams of changes in renal and intestinal injury biomarkers of various groups of animals provided in Example 4 of the present disclosure.

FIG. 4 shows diagrams of changes in renal and intestinal injury biomarkers of various groups of animals; A in FIG. 4 is a diagram of changes in creatinine; B in FIG. 4 is a diagram of changes in intestinal fatty acid-binding protein; in FIG. 4, Cr is creatinine; iFABP is intestinal fatty acid-binding protein; BL is baseline value; Sham is sham operation; CPR is cardiopulmonary resuscitation; SO is sodium octanoate; compared with the Sham group, *P<0.05; and compared with the CPR group, #P<0.05.

Example 5 Analysis of Cell Apoptosis in Cardiac, Cerebral, Renal, and Intestinal Tissues of Various Groups of Animals after Resuscitation At 24 h after resuscitation, those surviving animals in various groups were euthanized, and the tissues from the heart, brain, kidney, and intestine were obtained for pathological analysis. Results show that compared with the Sham group, the rates of apoptotic cells of various organs in the CPR and CPR+SO groups are obviously increased, and the differences between the groups all have statistical significance (all P<0.05). However, compared with the CPR group, cell apoptosis of various organs in the CPR+SO group is remarkably reduced, and the differences between the groups all have statistical significance (all P<0.05). See FIG. 5.

Figure 5:
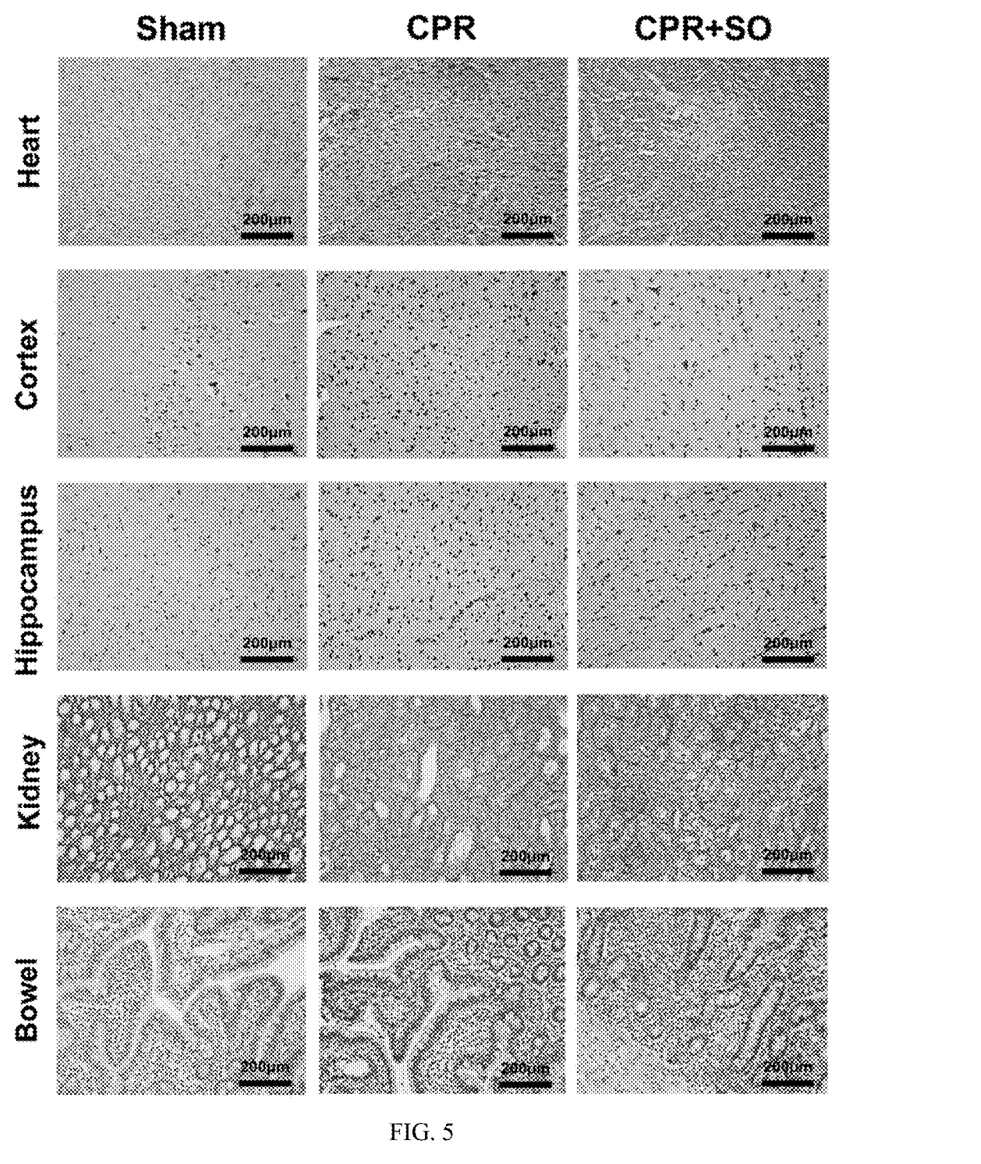
FIG. 5 shows analysis diagrams of cell apoptosis in the heart, brain, kidney, and intestine in various groups of animals after resuscitation provided in Example 5 of the present disclosure.

FIG. 5 shows analysis diagrams of cell apoptosis of cardiac, cerebral, renal, and intestinal tissues of various groups of animals after resuscitation. In FIG. 5, Heart is heart; Cortex is cortex; Hippocampus is hippocampus; Kidney is kidney; Bowel is bowel; TUNEL is in-situ end labeling; Sham is sham operation; CPR is cardiopulmonary resuscitation; and SO is sodium octanoate. Compared with the Sham group, *P<0.05; and compared with the CPR group, #P<0.05.

To sum up, the above medicine for improving the efficacy of cardiopulmonary resuscitation and post-resuscitation multiple organ dysfunction includes sodium octanoate and a pharmaceutically acceptable carrier. By administering a pharmaceutically effective dose of sodium octanoate that is used for promoting fatty acid oxidation energy supply during systemic ischemia-reperfusion injury caused by cardiac arrest and resuscitation, this medicine can further effectively improve the efficacy of cardiopulmonary resuscitation and post-resuscitation multiple organ dysfunction.

Finally, it should be explained that various examples above are merely used to illustrate the technical solutions of the present disclosure, rather than limiting the present disclosure; while the detailed description is made to the present disclosure with reference to various preceding examples, those ordinarily skilled in the art should understand that they still could modify the technical solutions described in various preceding examples, or make equivalent substitutions to some or all of the technical features therein. These modifications or substitutions do not make the corresponding technical solutions essentially depart from the scope of the technical solutions of various examples of the present disclosure.

INDUSTRIAL APPLICABILITY

The present disclosure provides the use of sodium octanoate in preparation of a medicine for improving the efficacy of cardiopulmonary resuscitation and post-resuscitation multiple organ dysfunction. Sodium octanoate is used to promote fatty acid oxidation energy supply during systemic ischemia-reperfusion injury caused by cardiac arrest and resuscitation, further can effectively improve the efficacy of cardiopulmonary resuscitation and post-resuscitation multiple organ dysfunction, has excellent industrial applicability, and can be widely applied to the technical field of pharmaceutical preparation.

What is claimed is:

1. A method for improving cardio-pulmonary resuscitation effect in a subject in need thereof, comprising administering to the subject a therapeutically effective dose of sodium octanoate, wherein the therapeutically effective dose of the sodium octanoate is 28.5 mg/kg; and the sodium octanoate is administered intravenously dissolved in an equal amount of solvent.

2. The method according to claim 1, wherein improving cardio-pulmonary resuscitation effect by the sodium octanoate is to effectively supply energy to a body in a stress state.

3. A method for improving multiple organ dysfunction after cardio-pulmonary resuscitation in a subject in need thereof, comprising administering to the subject a therapeutically effective dose of sodium octanoate, wherein the therapeutically effective dose of the sodium octanoate is 28.5 mg/kg; and the sodium octanoate is administered intravenously dissolved in an equal amount of solvent.

4. The method according to claim 3, wherein the sodium octanoate promotes fatty acid oxidation energy supply during systemic ischemia-reperfusion injury caused by sudden cardiac arrest resuscitation, thus improving multiple organ dysfunction after cardio-pulmonary resuscitation.

5. The method according to claim 3, wherein the multiple organ dysfunction comprises cardiac function injury, brain function injury, and renal and intestinal function injury.

* * * * *